United States Patent
Ohno et al.

(10) Patent No.: US 8,039,415 B2
(45) Date of Patent: Oct. 18, 2011

(54) HONEYCOMB STRUCTURE

(75) Inventors: Kazushige Ohno, Ibi-gun (JP); Masafumi Kunieda, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 0 days.

(21) Appl. No.: 11/864,565

(22) Filed: Sep. 28, 2007

(65) Prior Publication Data

US 2008/0085394 A1 Apr. 10, 2008

(30) Foreign Application Priority Data

Oct. 5, 2006 (WO) .................. PCT/JP2006/319993

(51) Int. Cl.
*B01J 23/10* (2006.01)

(52) U.S. Cl. ........... 502/304; 55/522; 55/523; 55/385.3; 55/DIG. 30; 55/524

(58) Field of Classification Search .................. 502/304; 55/523, 522, 385.3, DIG. 30, 524
See application file for complete search history.

(56) References Cited

U.S. PATENT DOCUMENTS

| | | | | |
|---|---|---|---|---|
| 5,993,762 | A * | 11/1999 | Rajaram et al. | 423/213.2 |
| 2003/0224933 | A1 * | 12/2003 | Kondo et al. | 502/439 |
| 2004/0047774 | A1 * | 3/2004 | Suwabe et al. | 422/177 |
| 2004/0176246 | A1 * | 9/2004 | Shirk et al. | 502/439 |
| 2005/0011174 | A1 | 1/2005 | Hong et al. | |
| 2005/0016140 | A1 * | 1/2005 | Komori et al. | 55/523 |
| 2005/0016141 | A1 | 1/2005 | Hong et al. | |
| 2006/0019061 | A1 | 1/2006 | Oshimi | |
| 2006/0032203 | A1 | 2/2006 | Komori et al. | |
| 2006/0093784 | A1 | 5/2006 | Komori et al. | |
| 2006/0159602 | A1 | 7/2006 | Ohno et al. | |
| 2006/0194018 | A1 * | 8/2006 | Ohno et al. | 428/116 |
| 2007/0227109 | A1 | 10/2007 | Hong et al. | |

(Continued)

FOREIGN PATENT DOCUMENTS

EP 1491248 12/2004

(Continued)

OTHER PUBLICATIONS

English translation of JP 2001207836 A, translation performed May 2011.*

(Continued)

*Primary Examiner* — Jason M Greene
*Assistant Examiner* — Anthony Shumate
(74) *Attorney, Agent, or Firm* — Ditthavong Mori & Steiner, P.C.

(57) ABSTRACT

A honeycomb structure includes large-volume cells and small-volume cells with a cell wall therebetween; a plug sealing at either one of end portions of the cells; and a catalyst supported on the cell wall. The large-volume cell has a larger cross-sectional area perpendicular to its longitudinal direction than that of the small-volume cell. The large-volume cell is sealed at one end portion of the honeycomb structure, while the small-volume cell is sealed at the other end portion of the honeycomb structure. The catalyst is supported only on the cell walls forming the large-volume cells, or on both of the cell walls forming said large-volume cells and the cell walls forming said small-volume cells. An amount of the catalyst supported on the cell walls forming the large-volume cells is larger per unit volume than that on the cell walls forming the small-volume cells.

22 Claims, 7 Drawing Sheets

U.S. PATENT DOCUMENTS

2008/0086993 A1 4/2008 Komori et al.
2008/0261806 A1 10/2008 Konstandopoulos et al.

FOREIGN PATENT DOCUMENTS

| | | |
|---|---|---|
| EP | 1538309 | 6/2005 |
| EP | 1568406 | 8/2005 |
| EP | 1676620 | 7/2006 |
| EP | 1712278 | 10/2006 |
| EP | 1717218 | 11/2006 |
| EP | 1726797 | 11/2006 |
| JP | 62-020613 | 1/1987 |
| JP | 2001-207836 | 8/2001 |
| JP | 2002-349238 | 12/2002 |
| JP | 2005-125209 | 5/2005 |
| JP | 2005-125237 | 5/2005 |
| WO | WO 02/26379 | 4/2002 |
| WO | WO 2004/024294 | 3/2004 |
| WO | WO 2005/014146 | 2/2005 |
| WO | WO 2005037405 A1 * | 4/2005 |
| WO | WO 2005/051523 | 6/2005 |
| WO | WO 2005/063653 | 7/2005 |

OTHER PUBLICATIONS

Summons to attend oral proceedings issued by the European Patent Office for european Application No. 07 015 951.2.

Chinese Office Action for corresponding CN Application No. 200680052827.0, Aug. 9, 2010.

* cited by examiner (a)

(b)

A-A line cross sectional view (a)

(b)

B-B line cross sectional view

HONEYCOMB STRUCTURE

CROSS-REFERENCE TO RELATED APPLICATIONS

The present application claims priority under 35 U.S.C. §119 to PCT Application No. PCT/JP2006/319993, filed on Oct. 5, 2006, entitled "HONEYCOMB STRUCTURE." The contents of this application are incorporated herein by reference in their entirety.

BACKGROUND OF THE INVENTION

1. Field of the Invention

The present invention relates to a honeycomb structure.

2. Discussion of the Background

Recently, particulate matters (hereinafter, also simply referred to as particulates), that are contained in exhaust gases discharged from internal combustion engines of vehicles, such as buses and trucks, and construction machines and the like, have raised serious problems as those particulates are harmful to the environment and the human body.

For this reason, various applications in which honeycomb structures, which are made from porous ceramics using silicon carbide, cordierite or the like as materials, are used as filters for capturing particulates in exhaust gases to purify the exhaust gases have been proposed.

With respect to the honeycomb structure of this kind, as shown in FIG. 6, a cylindrical-shaped honeycomb structure 30 having a plurality of cells 31 longitudinally (direction shown by an arrow D in FIG. 6(a)) placed in parallel with one another with a cell wall 33 therebetween has been known. As shown in FIG. 6(b), the cell 31 is sealed at either one of end portions on a flow-in side or a flow-out side of exhaust gases by a plug 32 so that exhaust gases flowing into one cell 31 surely pass through the cell wall 33 to flow out from another cell 31. In other words, when the honeycomb structure 30 is installed in an exhaust gas flow path of an internal-combustion system, particulates in exhaust gases discharged from the internal combustion system are captured by the cell walls 33 upon passing through the honeycomb structure 30 so that the exhaust gases are purified.

WO2004/024294 A discloses the honeycomb structure of this kind, in which cells (hereinafter, also referred to as flow-in side cells), each having a sealed end portion on the flow-out side of exhaust gases, are prepared as cells with a large volume (hereinafter, also referred to as large-volume cells), and cells (hereinafter, also referred to as flow-out side cells), each having a sealed end portion on the exhaust-gas flow-in side, are prepared as cells with a small volume (hereinafter, also referred to as small-volume cells) so that an aperture ratio on the flow-in side of exhaust gases is made relatively greater than the aperture ratio on the flow-out side of exhaust gases.

Moreover, with respect to an exhaust-gas purifying apparatus in which a catalyst is supported on cell walls of the honeycomb structure, Japanese Unexamined Patent Application Disclosure No. 2001-207836 A discloses an exhaust-gas purifying apparatus of an internal combustion system in which: a honeycomb filter having a plurality of cells formed therein is provided, and fine pores allowing exhaust gases to pass through are formed in each cell wall between mutually adjacent cells, a catalyst substance is supported inside the cell walls of the honeycomb filter, and the catalyst substance is distributed so as to be supported on the flow-in side of exhaust gases passing through the cell wall in an amount comparatively larger than that of the catalyst substance supported on the flow-out side. The contents of WO2004/024294 A and Japanese Unexamined Patent Application Disclosure No. 2001-207836 A are incorporated herein by reference in their entirety.

SUMMARY OF THE INVENTION

The pillar-shaped honeycomb structure according to the present invention includes a plurality of cells placed in parallel with one another in a longitudinal direction with a cell wall therebetween; a plug sealing either one of end portions of the cell; and a catalyst being supported on the cell wall. The plurality of cells are composed of large-volume cells and small-volume cells. The large-volume cell has a larger cross-sectional area perpendicular to a longitudinal direction thereof than a cross-sectional area perpendicular to the longitudinal direction of the small-volume cell. The large-volume cell is sealed at one end portion of the honeycomb structure, while the small-volume cell is sealed at the other end portion of the honeycomb structure. The catalyst is supported only on the cell walls forming the large-volume cells, or on both of the cell walls forming the large-volume cells and the cell walls forming the small-volume cells, and an amount of the catalyst supported on the cell walls forming the large-volume cells is larger per unit volume than that of the catalyst supported on the cell walls forming the small-volume cells.

Preferably, the catalyst is supported on the cell walls forming the large-volume cells and the small-volume cells, and the amount of the catalyst supported on the cell walls forming the large-volume cells is about 2 to about 10 times larger than that of the catalyst supported on the cell walls forming the small-volume cells.

Preferably, the catalyst is an oxide catalyst including at least one compound selected from the group consisting of $CeO_2$, $ZrO_2$, $FeO_2$, $Fe_2O_3$, $CuO$, $CuO_2$, $Mn_2O_3$ and $MnO$, and a composite oxide represented by a composition formula $A_nB_{1-n}CO_3$ (in the formula, A is La, Nd, Sm, Eu, Gd or Y, B is an alkali metal or alkali-earth metal, and C is Mn, Co, Fe or Ni, with n being in a range of $0 \leq n \leq 1$).

It is also preferable that the catalyst is an oxide catalyst containing at least $CeO_2$.

Further, the amount of the supported catalyst is preferably about 5 to about 60 g/l with respect to an apparent volume of the honeycomb structure.

The amount of said supported catalyst is preferably about 5 to about 60 g/l with respect to an apparent volume of said honeycomb structure. The catalyst is preferably supported on the cell wall, but not substantially supported inside the cell wall. The catalyst is preferably supported uniformly on the cell wall. A noble metal catalyst is preferably supported on the cell wall, besides the oxide catalyst as listed above. Also, a noble metal catalyst is preferably supported on the cell wall, besides the oxide catalyst containing at least $CeO_2$. A catalyst supporting layer made from oxide ceramics is preferably formed on the cell wall.

The cell wall preferably includes both of a cell wall between the adjacent large-volume cells and a cell wall between the large-volume cell and the small-volume cell adjacent to the large-volume cell. The thickness of the cell wall is preferably in a range from about 0.20 to about 0.40 mm. The cross-sectional area of the cells preferably has a polygonal shape which has at least four sides. More preferably, the cross-sectional area of the large-volume cells has an octagonal shape. Either or both of the cross section area of the large-volume cells and the cross section area of the small-volume cells preferably have a polygonal shape, and the polygonal shape is preferably at least one of a square shape, pentagonal shape, hexagonal shape, trapezoidal shape and octagonal shape.

A ratio of the cross-sectional area of the large-volume cells on a plane surface perpendicular to the longitudinal direction in relation to the cross-sectional area of the small-volume cells on a plane surface perpendicular to the longitudinal direction is preferably in a range from about 1.20 to about 6.00. At least one of the large-volume cell and the small-volume cell preferably has at least one of an R-chamfered shape and a C-chamfered shape in the cross-sectional area perpendicular to the longitudinal direction. More preferably, an R-dimension of the R-chamfered shape and a C-dimension of the C-chamfered shape is in a range from about 0.3 mm to about 2.5 mm.

The honeycomb structure is preferably a honeycomb block having a plurality of honeycomb fired bodies which are connected with one another by interposing a sealing material layer between the honeycomb fired bodies. The honeycomb structure is preferably a single honeycomb block formed as a single sintered body as a whole. Preferably, the honeycomb fired body includes silicon carbide or a blend of silicon carbide and metallic silicon. More preferably, the honeycomb block includes cordierite or aluminum titanate.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
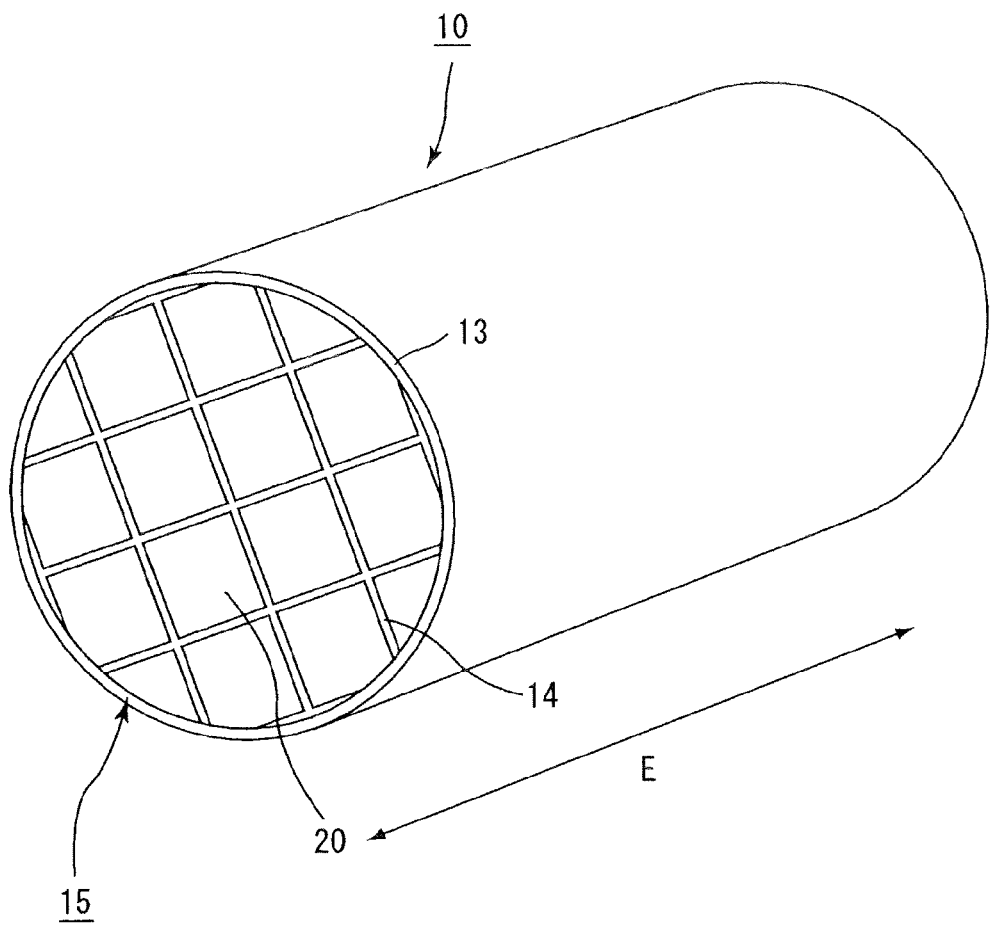
FIG. 1 is a perspective view schematically showing one example of a honeycomb structure in accordance with the embodiment of the present invention.

The embodiments will now be described with reference to the accompanying drawings, wherein like reference numerals designate corresponding or identical elements throughout the various drawings.

The following description will discuss the honeycomb structure according to the embodiment of the present invention.

The honeycomb structure according to the embodiment of the present invention includes the plurality of cells placed in parallel with one another in a longitudinal direction with the cell wall therebetween; the plug sealing either one of end portions of the cell; and the catalyst being supported on the cell wall. The plurality of cells are composed of large-volume cells and small-volume cells, the large-volume cell has a larger cross-sectional area perpendicular to a longitudinal direction thereof than a cross-sectional area perpendicular to the longitudinal direction of the small-volume cell, the large-volume cell is sealed at one end portion of the honeycomb structure, while the small-volume cell is sealed at the other end portion of the honeycomb structure, and the catalyst is supported only on the cell walls forming the large-volume cells, or on both of the cell walls forming the large-volume cells and the cell walls forming the small-volume cells, and an amount of the catalyst supported on the cell walls forming the large-volume cells is larger per unit volume than that of the catalyst supported on the cell walls forming the small-volume cells.

In accordance with the honeycomb structure according to the embodiment of the present invention, since the catalyst is supported only on the cell walls forming the large-volume cells, or the amounts of the supported catalysts on the large-volume cells and the small-volume cells have a predetermined relationship, the contact points between particulates contained in exhaust gases flowing into the large-volume cells and the catalyst may easily be increased so as to efficiently burn the particulates to be eliminated, while the required amount of the catalyst to be supported on one honeycomb structure is suppressed to a low level. Therefore, the honeycomb structure according to the embodiment of the present invention makes it possible for the honeycomb structure as a whole to burn and eliminate the particulates efficiently at a low cost.

Further, since the catalyst is supported on the cell walls forming the large-volume cells and the cell walls forming the small-volume cells in the above-mentioned relationship, it becomes easy to effectively suppress an increase in the pressure loss upon start of use, which corresponds to a problem raised when an excessive amount of a catalyst is supported on the cell walls forming the small-volume cells opening on the flow-out side of exhaust gases. Moreover, since the catalyst is supported on the cell walls forming the large-volume cells selectively or in a concentrated manner, the aperture ratio on the flow-in side of exhaust gases may easily be maintained at a high value even when a catalyst having a fixed thickness is supported on the cell walls, thereby making it easy to effectively suppress an increase in the pressure loss upon application of the honeycomb structure.

Further, since the honeycomb structure according to the embodiment of the present invention is provided with the large-volume cells and the small-volume cells, it becomes easy to provide a relatively large aperture ratio on the exhaust-gas flow-in side by using the large-volume cells as the flow-in side cells so as to easily reduce the range of increase in the pressure loss when the particulates are deposited. Moreover, a larger amount of ashes remained after the particulates are burned can be accumulated so that the service life can be prolonged.

In the conventional honeycomb structure disclosed in WO2004/024294 A, in comparison with a honeycomb structure in which the aperture ratio on the flow-in side of exhaust gases and the aperture ratio on the flow-out side of exhaust gases are equal to each other, since the aperture ratio on the flow-in side of exhaust gases is made relatively greater than the aperture ratio on the flow-out side of exhaust gases, when used as an exhaust-gas purifying filter, it becomes easy to suppress an increase in a pressure loss, and also to make the limit of particulate capturing amount increased so as to prolong the period until a regenerating process thereof.

In order to improve purifying efficiency of exhaust gases, and in particular burning efficiency of particulates, the inventors of the present invention have manufactured a honeycomb structure in which a catalyst is uniformly supported over the entire cell walls forming large-volume cells and small-volume cells. In this honeycomb structure, in comparison with a honeycomb structure in which the aperture ratio on the flow-in side of exhaust gases and the aperture ratio on the flow-out side of the exhaust gases are made equal to each other, a rate of an increase in the pressure loss that occurs following the capturing of the particulates is slightly small. However, a time period for regenerating the honeycomb structure by burning the accumulated particulates cannot be shortened from a certain period of time; consequently, it is difficult to efficiently regenerate the honeycomb structure while reducing the pressure loss. Moreover, since the catalyst has to be supported over the entire cell walls, the total amount of the catalyst increases, leading to high costs.

Moreover, in the honeycomb structure in which a catalyst is supported on the cell walls through the method described in Japanese Unexamined Patent Application Disclosure No. 2001-207836 A, the burning and eliminating efficiencies of particulates are not sufficient, and there is still some room for improvement to achieve better efficiency in purifying exhaust gases.

The embodiment of the present invention may easily provide a honeycomb structure in which contact points between particulates and a catalyst are increased so as to efficiently burn and remove the particulates, while keeping a total amount of the catalyst to be supported on cell walls to a low level and suppressing an increase in a pressure loss.

Figure 2:
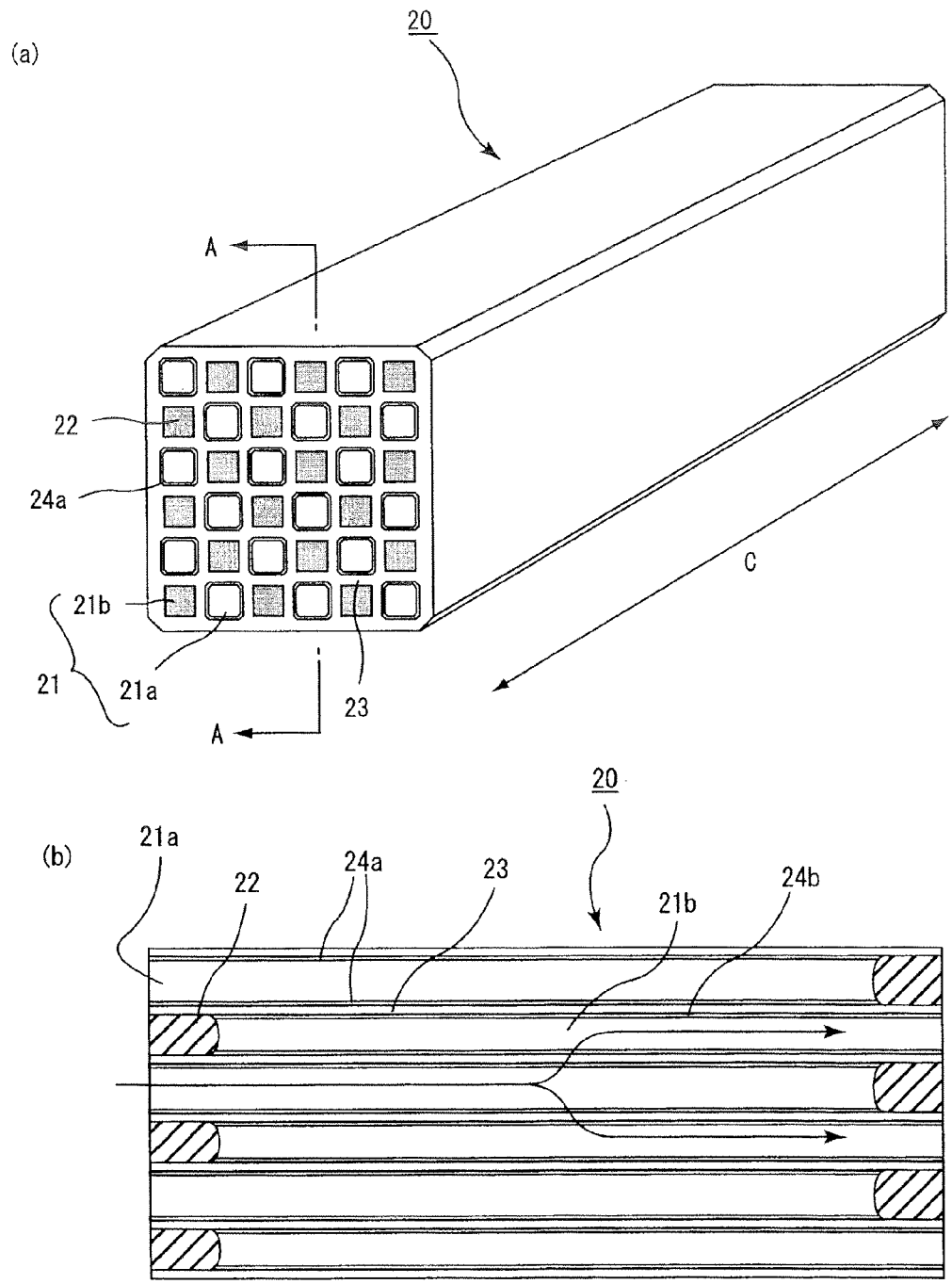
FIG. 2(a) is a perspective view schematically showing one example of a honeycomb fired body forming the honeycomb structure shown in FIG. 1.
FIG. 2(b) is a cross-sectional view taken along line A-A of the honeycomb fired body shown in FIG. 2(a).

FIG. 1 is a perspective view schematically showing one example of a honeycomb structure according to the embodiment of the present invention. FIG. 2(a) is a perspective view schematically showing one example of a honeycomb fired body forming the honeycomb structure according to the embodiment shown in FIG. 1, and FIG. 2(b) is a A-A line cross-sectional view of the honeycomb fired body shown in FIG. 2(a).

As shown in FIG. 1 and FIGS. 2(a) and 2(b), in the honeycomb structure 10 according to the embodiment of the present invention, a plurality of honeycomb fired bodies 20 are connected with one another by interposing a sealing material layer (adhesive layer) 14 to form a honeycomb block 15, and a sealing material layer (coat layer) 13 is formed on the outer periphery of this honeycomb block 15 to prevent exhaust gases from leaking.

In the honeycomb structure 10 according to the embodiment of the present invention shown in FIG. 1, although the sealing material layer (coat layer) 13 and the sealing material layers (adhesive layer) 14 are provided, the honeycomb structure according to the embodiment of the present invention may have a structure in which the plurality of honeycomb fired bodies 20 are simply physically connected with one another without the sealing material layers (adhesive layers) 14. Moreover, the honeycomb structure according to the embodiment of the present invention may be composed of a single honeycomb block that is formed as a single sintered body as a whole.

In the present specification, the honeycomb structure comprising a honeycomb block formed by binding the plurality of honeycomb fired bodies is also referred to as an aggregated honeycomb structure, and the honeycomb structure composed of the single honeycomb block formed as a single sintered body as a whole is also referred to as an integral honeycomb structure. The following description will mainly discuss the aggregated honeycomb structure as the honeycomb structure according to the embodiment of the present invention.

As shown in FIGS. 2(a) and 2(b), in the honeycomb fired body 20 forming the honeycomb structure 10, a plurality of cells 21 are placed in parallel with one another in the longitudinal direction (direction shown by an arrow C in FIG. 2(a)) with a cell wall 23 therebetween. The cells 21 are composed of two kinds of cells, that is, a large-volume cell 21a that is sealed with a plug 22 at an end portion on the flow-out side of the honeycomb fired body 20 and a small-volume cell 21b that is sealed with a plug 22 at an end portion on the flow-in side of the honeycomb fired body 20.

In the honeycomb fired body 20, when the large-volume cell 21a and the small-volume cell 21b are compared with each other, the cross-sectional area perpendicular to the longitudinal direction of the large-volume cell 21a is greater than the cross-sectional area perpendicular to the longitudinal direction of the small-volume cell 21b. Exhaust gases allowed to flow into the large-volume cell 21a surely pass through the cell wall 23 separating the cells 21 in a direction shown by an arrow in FIG. 2(b) to flow out the small-volume cell 21b so that the cell wall 23 functions as a filter.

In the honeycomb structure according to the embodiment of the present invention, the catalyst is supported only on the cell walls forming the large-volume cells. Alternatively, in the honeycomb structure according to the embodiment of the present invention, the catalyst is supported on both of the cell walls forming the large-volume cells and the cell walls forming the small-volume cells, the cell walls forming the large-volume cells supporting the greater amount of the catalyst per unit volume than the cell walls forming the small-volume cells.

In the cells 21 of the honeycomb fired body 20 shown in FIGS. 2(a) and 2(b), catalysts 24a and 24b are respectively supported on the cell walls forming the large-volume cells 21a and the cell walls forming the small-volume cells 21b. In this case, the cell walls forming the large-volume cells 21a support the larger amount of the catalyst 24a per unit value than the amount of catalyst 24b supported on the cell walls forming the small-volume cells 21b.

Here, in the present specification, provided that the cell wall separating the large-volume cell and the small-volume cell is cut off into two parts each having the same thickness, the cell wall forming the large-volume cells refers to a part located on the large-volume cell side of the two parts, and the cell wall forming the small-volume cell refers to the other part located on the small-volume cell side.

Here, the amount (g/l) of the catalyst per unit volume refers to, for example, with respect to the large-volume cell, a value obtained by dividing the total amount of the catalyst (g) obtained by summing the amounts of the catalyst supported on all the cell walls forming the respective large-volume cells 21a by the total volume (l) of the respective volumes of the large-volume cells. In other words, the amount of the catalyst (g/l) per unit volume of the large-volume cells is not referred to as an individual amount of catalyst supported on the respective cell walls forming each one of large-volume cells, but referred to as an amount of the catalyst on the entire large-volume cells. In the same manner, upon finding the amount of the catalyst per unit value of the small volume cells, the value is obtained by dividing the total amount of the catalyst (g) obtained by summing the amounts of the catalyst supported on all the cell walls forming the respective small-volume cells 21b by the total volume (l) of the respective volumes of the small-volume cells.

The catalysts 24a and 24b are supported on the cell walls 23, and preferably are not supported virtually on the inside of the cell walls 23.

Since the catalysts 24a and 24b are not supported virtually on the inside of the cell walls 23, the pores and the like inside the cell walls 23 are unlikely to be clogged by the catalysts. With this arrangement, exhaust gases are easily allowed to pass through the cell walls 23 smoothly, thereby making it easy to suppress an increase in the pressure loss.

In the present specification, the expression "the catalysts are not supported virtually on the inside of the cell walls" means that the maximum depth of an area, into which the catalyst penetrates, in the inside of the cell walls is limited to 30% or less of the thickness of the cell wall.

Moreover, the catalysts 24a and 24b are preferably supported uniformly on the cell walls 23.

When the catalysts 24a and 24b are supported on the cell walls 23 uniformly, it becomes easy to prevent irregular burning of particulates inside the cells as is caused when the catalysts are unevenly supported, so as to effectively burn and eliminate particulates.

In the honeycomb structure according to the embodiment of the present invention, the catalyst is supported on both of the cell walls forming the large-volume cells and the cell walls forming the small-volume cells, and the amount of the catalyst supported on the cell walls forming the large-volume cells is preferably set to about 2 to about 10 times greater than the amount of the catalyst supported on the cell walls forming the small-volume cells.

When the amount of catalyst supported on the large-volume cells per unit volume is about 2 times or more than the amount of catalyst supported on the small-volume cells, the ratio of the amount of the catalyst supported on the cell walls forming the small-volume cells to the amount of the catalyst on the entire honeycomb structure is unlikely to become too great to cause the pressure loss. In contrast, in a case where the amount of the catalyst supported on the large-volume cells exceeds about 10 times the amount of the catalyst supported on the cell walls forming the small-volume cells, there are hardly any changes in the burning and eliminating effects of particulates. Therefore, from the viewpoint of cutting the amount of catalyst on the entire honeycomb structure, the upper limit of the ratio of the amount of catalyst is preferably set to about 10 times.

In this manner, regardless of whether or not the catalyst is supported on the cell walls forming the small-volume cells, the larger amount of the catalyst is supported on the cell walls forming the large-volume cells selectively or in a concentrated manner so that it becomes easy to increase the contact points between the particulates and the catalyst, and also to keep the total amount of the catalyst required to a low level. As a result, the honeycomb structure according to the embodiment of the present invention makes it easy to efficiently burn and eliminate particulates.

The above-mentioned catalyst, which is an oxide catalyst, preferably includes at least one compound selected from the group consisting of $CeO_2$, $ZrO_2$, $FeO_2$, $Fe_2O_3$, $CuO$, $CuO_2$, $Mn_2O_3$ and $MnO$, and composite oxides represented by the composition formula $A_nB_{1-n}CO_3$ (in the formula, A is La, Nd, Sm, Eu, Gd or Y, B is an alkali metal or alkali-earth metal, and C is Mn, Co, Fe or Ni, with n being set in a range from $0 \leq n \leq 1$).

When the catalyst supported on the honeycomb structure includes any of the above-listed oxide catalysts, it becomes easy to provide high efficiencies in burning and eliminating particulates particularly contained in exhaust gases, and consequently to purify the exhaust gases efficiently, in addition, the oxide catalyst can be easily produced and prepared. For these reasons, the above-mentioned oxide catalysts are desirably used. Moreover, when the above-mentioned oxide catalyst is used, particulates may be positively burned and eliminated, and it also becomes easy to improve a regenerating rate of the honeycomb structure.

The regenerating rate of the honeycomb structure specifies how closely the increased weight of the honeycomb structure due to deposited particulates is allowed to approach the weight prior to the deposition of particulates by a regenerating process, and as the weight of the honeycomb structure comes closer to the weight prior to the deposition of particulates, the regenerating rate becomes higher.

The catalyst is an oxide catalyst, preferably containing at least $CeO_2$.

Since the oxide catalyst of this kind is superior in catalyst efficiency, rates of burning and eliminating particulates may easily be improved so that the exhaust gases purifying efficiency may be improved.

The amount of supported catalyst with respect to the apparent volume of the honeycomb structure is preferably set in a range from about 5 to about 60 g/l.

The amount of supported catalyst of about 5 g/l or more is unlikely to cause more portions of the cell walls in the honeycomb structure on which no oxide catalyst is supported, resulting in less presence of portions at which particulates and the oxide catalyst are not made in contact with each other; thus catalytic activity of reducing a burning temperature of particulates may be sufficiently exerted. On the other hand, the amount of supported catalyst exceeding about 60 g/l does not effectively increase the contact points between particulates and the catalyst, resulting that performance for disposing particulates is not improved so much. This is because the amount of supported catalyst is preferably about 60 g/l or less.

Here, in the present specification, the apparent volume of the honeycomb structure refers to an apparent volume defined by the outermost shape of the honeycomb structural body, and means the total volume of all the volumes including spaces, voids and the like, such as inner cells and pores inside the honeycomb structure.

Moreover, in addition to the mode of supported catalyst as shown in FIGS. 2(a) and 2(b), the embodiment of the present invention also includes the honeycomb structure in which the catalyst is supported only on cell walls forming the large-volume cells.

In the honeycomb structure according to the embodiment of the present invention, even when the catalyst is supported only on cell walls forming the large-volume cells, with no catalyst supported on cell walls forming the small-volume cells, a sufficient amount of catalyst is supported on the cell walls of the large-volume cells having a greater area (volume) inside the cell in comparison with cell walls forming the small-volume cells. Therefore, the honeycomb structure according to the embodiment of the present invention makes it easy to sufficiently ensure the contact points between particulates captured upon passing through the cell walls and the catalyst, and consequently to burn and eliminate the particulates efficiently.

In a case where the catalyst is supported only on the cell walls forming the large-volume cells, the amount of catalyst per unit volume preferably falls in a range of the amount of supported catalyst with respect to the apparent volume of the honeycomb structure, that is, in a range from about 5 to about 60 g/l.

Moreover, besides the above-mentioned oxide catalyst, a noble metal catalyst, such as platinum, palladium and rhodium, may be supported on the cell walls of the honeycomb structure according to the embodiment of the present invention.

In a case where the noble metal catalyst is supported on the cell walls, in addition to particulates, toxic gas components and the like contained in exhaust gases can be efficiently decomposed, converted or eliminated so that the exhaust gases may be further purified and converted in a higher level.

In this case, a catalyst supporting layer made from oxide ceramics, such as alumina, titania, zirconia and silica, may be formed on the cell walls of the honeycomb structure according to the embodiment of the present invention.

When the catalyst supporting layer is formed on the cell wall, it becomes easy to effectively carry out a dispersing process required for supporting the catalyst on the cell walls, and to positively affix and have the catalyst supported thereon.

Moreover, the honeycomb structure according to the embodiment of the present invention makes it easy to efficiently suppress an increase in the pressure loss.

Figure 8:
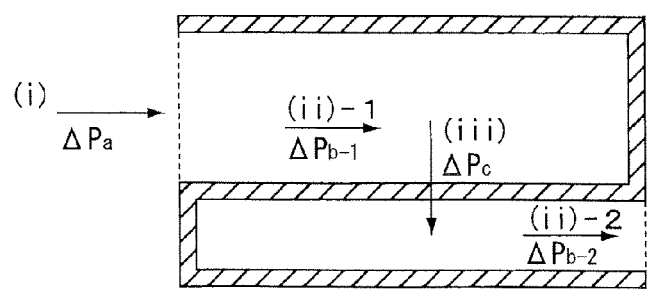
FIG. 8 is a conceptual view describing main factors giving influence to a pressure loss of the honeycomb structural body.

FIG. 8 is a conceptual view describing main factors having an influence on the pressure loss of the honeycomb structure.

As shown in FIG. 8, the main factors that cause adverse effects on the pressure loss of the honeycomb structure upon purifying exhaust gases include: (i) aperture ratio on the flow-in side of exhaust gases: $\Delta P_a$, (ii) friction caused by the exhaust gases upon passing through the cell ((ii)-1 flow-in side cell: $\Delta P_{b-1}$, (ii)-2 flow-out side cell: $\Delta P_{b-2}$), (iii) resistance caused by the exhaust gases upon passing through the cell: $\Delta P_c$, and the like.

In the honeycomb structure in which the large-volume cells and the small-volume cells are formed, the total sums of cross-sectional areas perpendicular to the longitudinal direction are different between the flow-in side cell and the flow-out side cell. For this reason, compared to the honeycomb structure in which all the cells have virtually the same volume, the honeycomb structure with the large-volume cells and the small-volume cells has the larger cross-sectional area of the flow-in side cell in a state prior to capturing particulates. Since the cross-sectional area of the flow-in side cell is larger, exhaust gases are more easily allowed to flow in the flow-in side cells so that it is considered that the pressure loss, caused by the aperture ratio on the flow-in side of the exhaust gases and friction ((i); $\Delta P_a$+(ii)-1; $\Delta P_{b-1}$) caused by the exhaust gases upon passing through the flow-in side cell, can be reduced.

In contrast, when the cross-sectional area of the flow-out side cell is smaller, friction ((ii)-2; $\Delta P_{b-2}$) caused by the exhaust gases upon passing through the flow-out side cell becomes greater. Moreover, resistance ((iii); $\Delta P_c$) caused by the exhaust gases upon passing through the cell wall becomes greater. Consequently, the pressure loss on the initial stage of capturing particulates tends to become higher.

In the honeycomb structure having the large-volume cells and the small-volume cells, the above-mentioned factors of the pressure loss mutually have influences on one another so that the entire pressure loss is determined.

In general, upon capturing particulates, the resistance ((iii); $\Delta P_c$) caused by exhaust gases upon passing through the cell wall becomes greater among the factors that cause an increase in the pressure loss; however, in the honeycomb structure according to the embodiment of the present invention, since the increase in the resistance ((iii); $\Delta P_c$) caused by the exhaust gases upon passing through the cell wall can be suppressed so that it becomes easy to suppress an increase in the pressure loss, which has been caused in the conventional honeycomb structure, as a whole.

Moreover, in the honeycomb structure according to the embodiment of the present invention, since the amount of the catalyst on cell walls forming the large-volume cells and the amount of the catalyst on the cell walls forming the small volume cells have the predetermined relationship, among the factors that cause the increase in the pressure loss, the friction ((ii)-2; $\Delta P_{b-2}$) caused by the exhaust gases upon passing through the flow-out side cell and the friction ((iii); $\Delta P_c$) caused by the exhaust gases upon passing through the cell wall may be effectively reduced. Therefore, the honeycomb structure according to the embodiment of the present invention has a structure in which the increase in the pressure loss is suppressed as a whole.

In the honeycomb structure according to the embodiment of the present invention, both of a cell wall commonly possessed by one large-volume cell 21a and another adjacent large-volume cell 21a and a cell wall commonly possessed by one large-volume cell 21a and an adjacent small-volume cell 21b may be prepared. Therefore, in the honeycomb structure according to the embodiment of the present invention, particulates are allowed to evenly deposit not only on the cell wall commonly possessed by adjacent large-volume cell and small-volume cell, but also on the cell wall commonly possessed by adjacent large-volume cells.

In the honeycomb structure according to the embodiment of the present invention, since the amount of catalyst on the large-volume cell and the amount of catalyst on the small volume cell have the predetermined relationship, it becomes easy to efficiently burn and eliminate particulates, while reducing the pressure loss.

Although not particularly limited, the thickness of the cell walls of the honeycomb structure according to the embodiment of the present invention is preferably set in a range from about 0.20 to about 0.40 mm.

The thickness of the cell wall of about 0.20 mm or more is unlikely to cause the thickness of the cell walls supporting the honeycomb structure to become too thin, and it becomes easy to sufficiently maintain the strength of the honeycomb structure, in contrast, the thickness of about 0.40 mm or less does not tend to cause an increase in the pressure loss.

With respect to the size of the honeycomb structure 10 according to the embodiment of the present invention, although not particularly limited, it is appropriately determined by taking into consideration the size of an exhaust-gas passage of an internal combustion system to be used and the like. With respect to the shape of the honeycomb structure according to the embodiment of the present invention, although not particularly limited, any shape, such as a round, elliptical and rectangular pillar, may be used as long as it has a pillar shape, and normally, those of a round pillar as shown in FIG. 1 are normally used.

In the honeycomb structure according to the embodiment of the present invention, although not particularly limited, the honeycomb fired body is mainly composed of, for example, nitride ceramics such as aluminum nitride, silicon nitride, boron nitride and titanium nitride, carbide ceramics, such as silicon carbide, zirconium carbide, titanium carbide, tantalum carbide and tungsten carbide, and oxide ceramics, such as alumina, zirconia, cordierite, mullite and aluminum titanate, and the like.

Among these, non-oxide ceramics are preferably used, and in particularly, silicon carbide is more preferably used. This is because these ceramics are superior in the heat resistant property, mechanical strength, thermal conductivity and the like. Moreover, silicon-containing ceramic such as metallic silicon blended with the above-mentioned ceramics and ceramic bound by silicon or silicate compounds can also be used as the constituting material of the honeycomb structure. And out of these, those ceramics (silicon-containing silicon carbide) in which metallic silicon is blended with silicon carbide are preferably used.

Although not particularly limited, a porosity of the honeycomb fired body is preferably set in a range from about 35 to about 60%.

The porosity of about 35% or more does not tend to cause clogging in the honeycomb structure according to the embodiment of the present invention soon; in contrast, the porosity of about 60% or less does not tend to cause a reduction in the strength of the honeycomb fired body, not resulting that the honeycomb fired body may be easily destroyed.

Here, the above-mentioned porosity can be measured through known methods, such as a mercury injection method, Archimedes method and a measuring method using a scanning electronic microscope (SEM).

The average pore diameter of the honeycomb fired body is preferably set in a range from about 5 to about 30 µm.

The average pore diameter of about 5 µm or more does not tend to cause clogging of particulates; in contrast, the average pore diameter of about 30 µm or less does not tend to allow particulates to easily pass through the pores, ensuring that the particulates can be captured by the honeycomb fired body which functions as a filter.

Although the particle diameter of the ceramic used for manufacturing the honeycomb structure is not particularly limited, composition which is less susceptible to shrinkage in the succeeding firing process are preferably used, and for example, mixed powder, prepared by combining 100 parts by weight of ceramic particles having an average particle diameter from about 0.3 to about 50 µm with about 5 to about 65 parts by weight of ceramic particles having an average particle diameter from about 0.1 to about 1.0 µm, is preferably used. By mixing the ceramic particles having the above-mentioned particle diameter at the above-mentioned compounding ratio, it becomes possible to manufacture a honeycomb fired body having a porous property.

The above-mentioned plug is preferably made from porous ceramics.

In the honeycomb structure according to the embodiment of the present invention, since the honeycomb fired body is made from porous ceramics, by preparing the plug made from the same porous ceramics as the honeycomb fired body, the bonding strength of the two members may easily be increased. Moreover, by adjusting the porosity of the plug in the same manner as the honeycomb fired body, the thermal expansion coefficient of the honeycomb fired body and the thermal expansion coefficient of the plug may properly be coordinated with each other so that it becomes easy to prevent a gap from occurring between the plug and the cell walls due to a thermal stress upon manufacturing as well as in use, and also to prevent cracks from occurring in the plug as well as in the cell wall at portions in contact with the plug.

In a case where the plug is made from porous ceramics, although not particularly limited, for example, the same material as the ceramics forming the above-mentioned honeycomb fired body may be used.

In the honeycomb structure according to the embodiment of the present invention, as shown in FIG. 1, the sealing material layer (adhesive layer) 14 and the sealing material layer (coat layer) 13 are respectively formed between the honeycomb fired bodies and on the periphery of the honeycomb block 15. The sealing material layer (adhesive layer) 14 formed between the honeycomb fired bodies 20 is allowed to function as an adhesive agent that mutually combines the honeycomb fired bodies with one another, on the other hand, the sealing material layer (coat layer) 13 formed on the periphery of the honeycomb block 15 has a function for preventing leakage of exhaust gases through the periphery of the honeycomb block 15 when the honeycomb structure 10 according to the embodiment of the present invention is placed in the exhaust-gas passage of an internal combustion engine.

With respect to the material forming the sealing material layer, although not particularly limited, examples thereof include an inorganic binder, an organic binder, inorganic fibers, inorganic particles, a material made by combining these, or the like.

As described above, in the honeycomb structure according to the embodiment of the present invention, although the sealing material layers are formed between the honeycomb fired bodies as well as on the periphery of the honeycomb block, these sealing material layers may be made from the same material or may be made from materials different from each other. Moreover, when the sealing material layers are made from the same material, the compounding ratios of the materials may be the same or different from each other.

With respect to the inorganic binder, for example, silica sol, alumina sol and the like may be used. Each of these may be used alone, or two or more kinds of these may be used in combination. Among the inorganic binders, silica sol is more preferably used.

With respect to the organic binder, examples thereof include polyvinyl alcohol, methyl cellulose, ethyl cellulose and carboxymethyl cellulose and the like. Each of these may be used alone, or two or more kinds of these may be used in combination. Among the organic binders, carboxymethyl cellulose is more preferably used.

With respect to the inorganic fibers, examples thereof include ceramic fibers, made from silica-alumina, mullite, alumina, silica and the like. Each of these may be used alone, or two or more kinds of these may be used in combination. Among the ceramic fibers, silica-alumina fibers are more preferably used.

With respect to the inorganic particles, examples thereof include carbides, nitrides and the like, and specific examples include inorganic powder, whiskers and the like made from silicon carbide, silicon nitride, boron nitride and the like. Each of these may be used alone, or two or more kinds of these may be used in combination. Among the inorganic particles, silicon carbide having superior thermal conductivity is preferably used.

In the present description, the inorganic particles include inorganic powders and whiskers.

The sealing material layer (adhesive layer) 14 and the sealing material layer (coat layer) 13 may be formed of a dense material or a porous material.

In the honeycomb structure according to the embodiment of the present invention, the cross-sectional shape of the cell is preferably set to a polygonal shape of tetragonal or more, among polygonal shapes, in particular, the cross-sectional shape of the large volume cell is preferably set to an octagonal shape.

When the cross-sectional shape of the cell is formed into a round shape or an elliptical shape different from a polygonal shape, the cross-sectional area of the cell wall becomes larger, making it difficult to increase the aperture ratio. Moreover, only the cross section of the large-volume cells may be formed into a polygonal shape such as a square shape, pentagonal shape, hexagonal shape, trapezoidal shape and octagonal shape, or only the cross section of the small-volume cells may be formed into the above-mentioned polygonal shape, or both of the cross-sections of the large-volume cells and the small-volume cells may be formed into the above-mentioned polygonal shape. Moreover, with respect to the cross-sectional shape of the cells, various polygonal shapes may be allowed to coexist.

In the honeycomb structure according to the embodiment of the present invention, with respect to the ratio of the cross-sectional area perpendicular to the longitudinal direction of the large volume cells to the cross-sectional area perpendicular to the longitudinal direction of the small volume cells (cross-sectional area of the large-volume cell/cross-sectional area of the small-volume cell: hereinafter, referred to as ratio of aperture ratios), a preferable lower limit value is set to about 1.20, and a preferable upper limit value is set to about 6.00.

When the ratio of aperture ratios is about 1.20 or more, the effects exerted by preparing the large-volume cells and the small-volume cells may easily be obtained, on the other hand, when the ratio of aperture ratios is about 6.00 or less, the volume of the small-volume cells does not become extremely small, with the result that the pressure loss does not tend to become too high.

In the present specification, in a case where the catalyst is supported only on the cell walls forming the large-volume cells, or in a case where the catalyst is supported on both of the cell walls forming the large-volume cells and the cell walls forming the small-volume cells, the above-mentioned area of the cross-sectional cell refers to a value in which, upon supporting the catalyst, the thickness of the catalyst is not taken into consideration. In other words, the above-mentioned ratio of aperture ratios refers to a ratio of aperture ratios obtained in a state in which no catalyst is supported.

The lower limit value of the ratio of aperture ratios is preferably set to about 1.30, more preferably set to about 1.55, and particularly preferably set to about 2.00. The upper limit value of the ratio of aperture ratio is preferably set to about 2.75, more preferably set to about 2.54, and particularly preferably set to about 2.42. By using the ratio of aperture ratios in this range, it becomes easy to further reduce the pressure loss upon capturing particulates.

Figure 3:
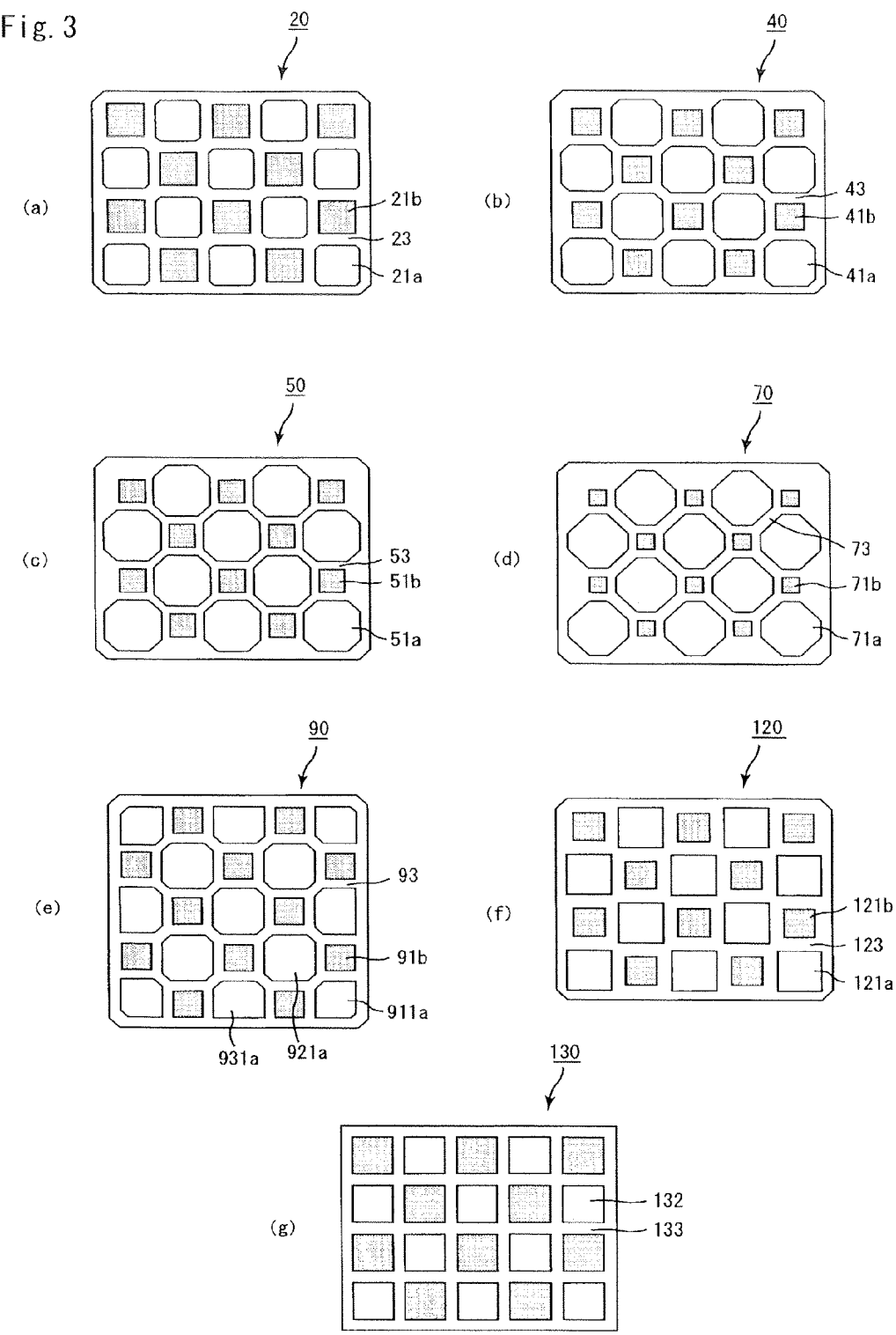
FIGS. 3(a) to 3(f) are schematic views each showing one example of a cross section perpendicular to a longitudinal direction of the honeycomb fired body forming the honeycomb structure according to the embodiment of the present invention.
FIG. 3(g) is a schematic view showing one example of a cross section perpendicular to the longitudinal direction of a honeycomb fired body forming a conventional honeycomb structure.

FIGS. 3(a) to 3(f) and FIGS. 4(a) to 4(g) are schematic views each showing one example of a cross section perpendicular to a longitudinal direction of the honeycomb fired body forming the honeycomb structure according to the embodiment of the present invention, and FIG. 3(g) is a schematic view showing one example of a cross section perpendicular to the longitudinal direction of a honeycomb fired body forming a conventional honeycomb structure. In FIGS. 3(a) to 3(g) and FIGS. 4(a) to 4(g), the catalyst is not illustrated.

In FIG. 3(a), the ratio of aperture ratios is 1.55, in FIG. 3(b), the ratio of aperture ratios is 2.54, in FIG. 3(c), the opening ratio is 4.45, in FIG. 3(d), the ratio of aperture ratios is 9.86, in FIG. 3(e), the ratio of aperture ratios is 1.55, in FIG. 3(f), the ratio of aperture ratios is 2.00, and in FIG. 3(g), the ratio of aperture ratios is 1.00.

Figure 4:
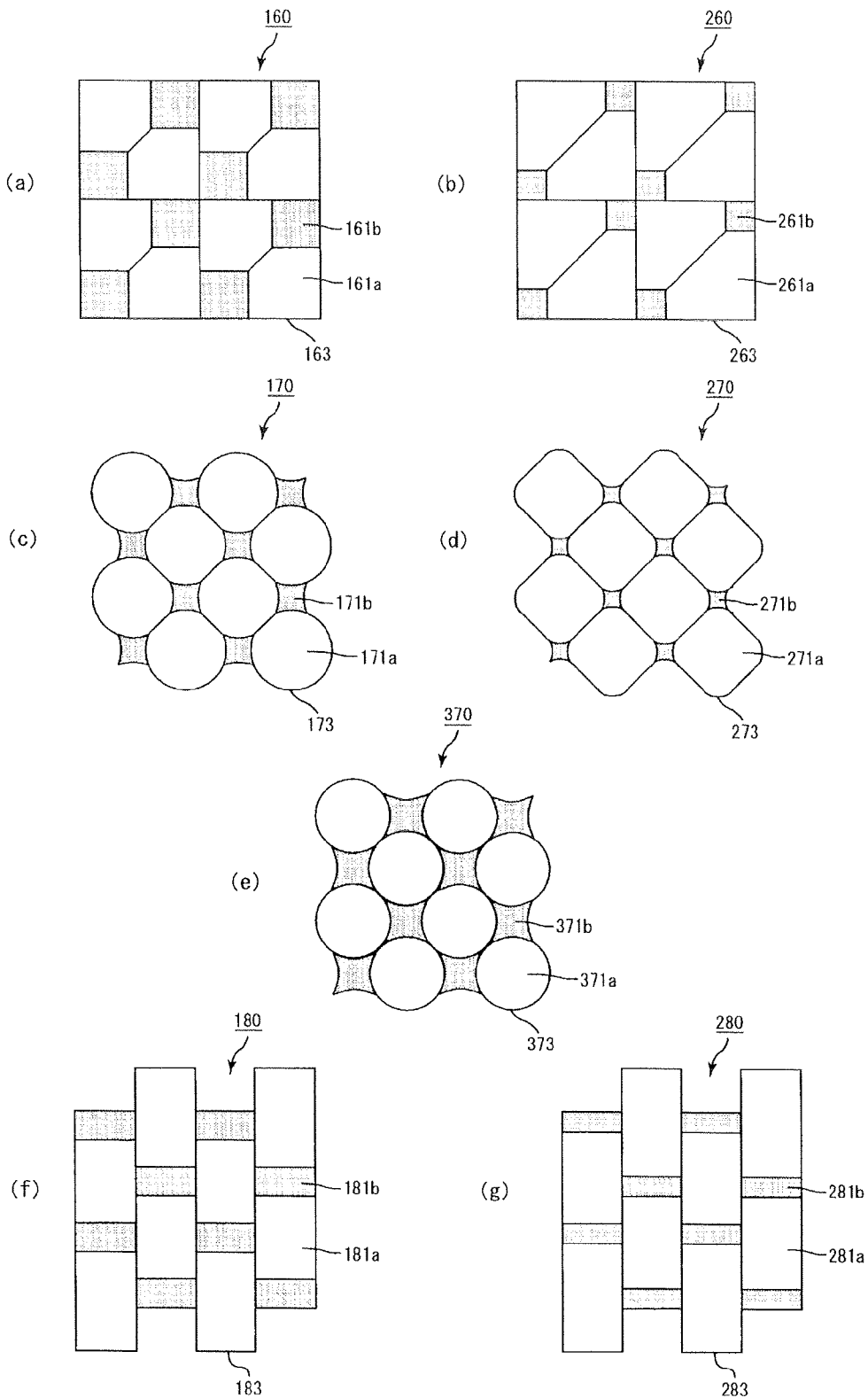
FIGS. 4(a) to 4(g) are schematic views each showing another example of the cross section perpendicular to the longitudinal direction of the honeycomb fired body forming the honeycomb structure according to the embodiment of the present invention.

Here, in FIGS. 4(a), 4(c) and 4(f), all the ratios of aperture ratios are 4.45, in FIGS. 4(b), 4(d) and 4(g), all the ratios of aperture ratios are 6.00, and in FIG. 4(e) the ratio of aperture ratios is 1.64.

The honeycomb fired body 70 shown in FIG. 3(d) has the large ratio of aperture ratios that is 9.86. As described earlier when the ratio of aperture ratios exceeds about 6.00, the volume of the small-volume cell 71b out of which exhaust gases having passed through the cell walls 73 flow becomes too small, with the result that the pressure loss tends to become too large.

In the honeycomb fired bodies 20, 40, 50 and 70 shown in FIGS. 3(a) to 3(d), the shape of the cross section perpendicular to the longitudinal direction of the large-volume cell is an octagonal shape, and the shape of the cross section of the small-volume cell is a tetragonal shape (square shape). In the honeycomb fired body of this kind, the cross section perpendicular to the longitudinal direction of the small volume cell is preferably set to a tetragonal shape.

Here, in FIGS. 3(a) to 3(d), reference numerals 21a, 41a, 51a and 71a represent large-volume cells, 21b, 41b, 51b and 71b represent small-volume cells, and 23, 43, 53 and 73 represent cell walls.

The honeycomb fired body 90 shown in FIG. 3(e) is formed by four kinds of cells having different cross-sectional shapes, that is, a small-volume cell 91b having a tetragonal shape in its cross section, large-volume cells 911a and 931a having a hexagonal shape in their cross section, and a large-volume cell 921a having an octagonal shape in its cross section, and the respective cells are arranged so that the thickness of the peripheral edge cell wall of the honeycomb fired body is set to be even. In this honeycomb fired body 90, the cell having the smallest cross-sectional area is the small-volume cell 91b, the cells having a larger cross-sectional area than the small-volume cell 91b are the large-volume cells 911a, 921a and 931a.

In FIG. 3(e), reference number 93 represents a cell wall.

In the honeycomb fired body 120 shown in FIG. 3(f), both of the cross-sectional shape perpendicular to the longitudinal direction of the large-volume cell 121a and the cross-sectional shape of the small-volume cell 121b are set to a tetragonal shape (square shape). In this manner, the cross-sectional shapes of the large-volume cell and the small-volume cell may be similar shapes. Here, in FIG. 3(f), reference numeral 123 represents a cell wall. In FIG. 3(g), reference numeral 130 represents a honeycomb fired body, 132 represents a cell, and 133 represents a cell wall.

In the honeycomb fired bodies 160 and 260 shown in FIGS. 4(a) and 4(b), each of the cross-sectional shapes of large-volume cells 161a and 261a is a pentagonal shape, with its three angles allowed to form virtually right angles. The cross-sectional shape of each of the small-volume cells 161b, 261b is a quadrangle and the small-volume cells are allowed to respectively occupy portions that diagonally face each other in a larger tetragonal shape.

In FIGS. 4(a) and 4(b), reference numerals 163 and 263 represent cell walls.

Honeycomb fired bodies 170 and 270 shown in FIGS. 4(c) and 4(d) have cross-sectional shapes that are respectively obtained by modifying the cross-sectional shapes shown in FIGS. 3(a) to 3(d), and those shapes are obtained by convexly warping the cell walls commonly possessed by the large-volume cells 171a or 271a and the small-volume cells 171b or 271b, respectively, with a certain curvature toward the small-volume cell side. This curvature may be desirably determined.

Here, in FIGS. 4(c) and 4(d), each of reference numerals 173 and 273 represents a cell wall.

In FIGS. 4(c) and 4(d), a structure in which the curved line forming the cell wall commonly possessed by the respective large-volume cells 171a or 271a and the respective small-volume cells 171b or 271b corresponds to a ¼ circle has been exemplified. In this case, the shape in which the ratio of aperture ratios is minimized is given as a shape shown in FIG. 4(c), and the ratio of aperture ratios at this time is approximately 3.66.

A honeycomb fired body 370, shown in FIG. 4(e), has a shape further modified from the cross-sectional shape shown in FIGS. 4(c) and 4(d), and this shape is obtained by convexly warping the cell walls commonly possessed by a large-volume cell 371a and a small-volume cell 371b with a certain curvature toward the small-volume cell side, with the cross-sectional shape of the large-volume cell 371a formed only by curved lines, and unlike the honeycomb fired bodies 170 and 270, there is no linear cell wall commonly possessed by the large-volume cells 371a.

Here, in FIG. 4(e), reference numeral 373 represents a cell wall.

Each of honeycomb fired bodies 180 and 280, shown in FIG. 4(f) and FIG. 4(g), has a rectangular structural unit in which the respective large-volume cells 181a or 281a and the respective small-volume cells 181b or 281b, each of which has a tetragonal shape (rectangular shape), are placed to be adjacent to each other longitudinally, and the structural units are continuously connected longitudinally, and placed in a staggered manner in the lateral direction.

Here, in FIGS. 4(f) and 4(g), each of reference numerals 183 and 283 represents a cell wall.

In the honeycomb structure according to the embodiment of the present invention, the cross-sectional area perpendicular to the longitudinal direction at least one of the large-volume cell and the small-volume cell is preferably allowed to have either of faces of a R-chamfered shape and a C-chamfered shape.

This structure is preferable because it becomes easy to prevent stress from concentrating on each of the corner portions of the cell.

In the present specification, the chamfered shape refers to a shape like a square having chamfered corner portions, for example, in a cell having a square shape in its cross section. With respect to a specific method for forming the cell into such a shape, although not particularly limited, for example, a method in which a die corresponding to such a shape is manufactured and an extrusion-molding process is then carried out is proposed.

Moreover, the R-chamfered shape refers to a shape like a square having corner portions each of which is chamfered into an arc shape, for example, with respect to a cell having a square shape in its cross section. The C-chamfered shape refers to, for example, with respect to a cell having a square shape in its cross section, a shape like a square having corner portions each of which is chamfered to be linearly cut off so that all remaining angles are obtuse.

Moreover, as shown in FIGS. 3(a) to 3(f), corner portions on the periphery of a honeycomb structure or each of honeycomb fired bodies that form a honeycomb structure are preferably formed into to the R-chamfered faces or the C-chamfered faces.

With respect to the R-dimension of the R-chamfered face and the C-dimension of the C-chamfered face that are formed on corner portions of a honeycomb fired body, the lower limit value is preferably set to about 0.3 mm, and more preferably set to about 0.5 mm; in contrast, the upper limit value is preferably set to about 2.5 mm.

The dimensions of about 0.3 mm or more tend to suppress a thermal stress from concentrating on each of the corners, and also tend to sufficiently improve the flowability of a gas in a cell placed on each of the corner portions. In contrast, with respect to a cell positioned on the corner, the dimension of about 2.5 mm or less does not make the roundness of each of the corner portions become too large so that a corner portion having an acute angle does not tend to be generated, with the result that cracks do not tend to occur easily on the contrary.

In the present specification, the R-dimension refers to a radius of the arc in the R-chamfered face with each of corners formed into an arc shape. Moreover, the C-dimension refers to a cut-out length with respect to the longer side of two sides which are cut out by the C-chamfering process and originally form the corner.

The following description will discuss a manufacturing method for the above-mentioned honeycomb structure according to the embodiment of the present invention.

First, a honeycomb molded body, which has virtually the same shape as the honeycomb fired body 20 shown in FIG. 2(a), except that end portions of cells are not sealed and that no catalyst is supported thereon, is manufactured through an extrusion-molding process by using a raw material paste mainly composed of ceramic powder and a firing process.

With respect to the raw material paste, although not particularly limited, a raw material paste, which allows the honeycomb fired body 20 after the manufacturing process to have a porosity in a range from about 20 to about 60%, is preferably used, and, for example, a raw material paste, formed by adding a binder and a dispersant to the above-mentioned ceramic powder and the like, may be used.

With respect to the above-mentioned binder, although not particularly limited, examples thereof include: methylcellulose, carboxy methylcellulose, hydroxy ethylcellulose, polyethylene glycol and the like.

In general, the compounding amount of the above-mentioned binder is preferably set to about 1 to about 10 parts by weight with respect to 100 parts by weight of the ceramic powder.

With respect to the above-mentioned dispersant solution, although not particularly limited, for example, an organic solvent such as benzene, alcohol such as methanol, water and the like may be used.

An appropriate amount of the above-mentioned dispersant solution is blended so as to set the viscosity of the material raw paste in a predetermined range.

After these ceramic powders, binder and dispersant solution are mixed by using an attritor or the like, the resulting mixture is sufficiently kneaded by using a kneader or the like, and then extrusion-molded so that a honeycomb molded body is manufactured.

Moreover, a molding auxiliary may be added to the raw material paste, if necessary.

With respect to the molding auxiliary, although not particularly limited, examples thereof include ethylene glycol, dextrin, fatty acid soap, fatty acid, polyvinyl alcohol and the like.

Furthermore, a pore-forming agent, such as balloons that are fine hollow spheres composed of oxide-based ceramics or spherical acrylic particles, graphite and the like, may be added to the above-mentioned raw material paste, if necessary.

With respect to the above-mentioned balloons, although not particularly limited, for example, alumina balloons, glass micro-balloons, shirasu balloons, fly ash balloons (FA balloons), mullite balloons and the like may be used. Among these, fly ash balloons are more preferably used.

Next, the ceramic molded body is dried by using a drying apparatus, such as a microwave drying apparatus, a hot-air drying apparatus, a dielectric drying apparatus, a reduced-pressure drying apparatus, a vacuum drying apparatus and a frozen drying apparatus, and then two ends of the dried honeycomb molded body are cut, if necessary. Subsequently, a plug material paste that forms plugs is filled in predetermined cells so that a opening-sealing process for sealing the cells is carried out.

With respect to the plug material paste, although not particularly limited, those plug material pastes that allow the plug formed through post processes to have porosity in a range from about 35 to about 60% are preferably used. With respect to the plug material paste, for example, the same material as that of the raw material paste may be used, and a plug material past prepared by adding a lubricant, a solvent, a dispersant and a binder to the ceramic powder used for the above-mentioned raw material paste is preferably used.

Next, a degreasing process and a firing process are carried out on the honeycomb molded body having undergone the drying treatment and the opening-sealing treatment under predetermined conditions so that it is possible to manufacture a honeycomb fired body that has a structure having a plurality of cells longitudinally placed in parallel with one another with a cell wall therebetween.

With respect to the conditions and the like of the degreasing and firing processes of the honeycomb molded body, conventional conditions that have been used upon manufacturing a honeycomb fired body, and the like may be adopted.

Next, a sealing material paste to form a sealing material layer 14 (adhesive layer) is applied onto side faces of the honeycomb fired body 20 with a even thickness to form a sealing material paste layer, and a laminating process for laminating another honeycomb fired body 20 on this plug material paste layer is successively repeated so that a laminated body of the honeycomb fired bodies 20 having a rectangular pillar shape with a predetermined size is manufactured.

Here, with respect to the material for forming the sealing material paste, the description thereof is omitted since the explanation has already been given.

Next, the laminated body of the honeycomb fired bodies 20 is heated so that the sealing material paste layers are dried and solidified to form sealing material layers (adhesive layers) 14, and the peripheral portion thereof is then cut by using a diamond cutter or the like into a shape shown in FIG. 1 so that a honeycomb block 15 is manufactured.

Then, a sealing material layer (coat layer) 13 is formed on the outer periphery of the honeycomb block 15 by using the above-mentioned sealing material paste so that a honeycomb structure 10 in which a plurality of the honeycomb fired bodies 20 are combined with one another by interposing the sealing material layer (adhesive layers) 14 is manufactured.

Thereafter, a catalyst, for example, an oxide catalyst, is supported on the cell walls of the honeycomb structure so that an aggregated honeycomb structure is formed.

The supporting process of the catalyst may be carried out on the honeycomb fired bodies prior to being formed into the aggregated body.

With respect to the method for supporting the oxide catalyst on the cell walls, for example, a method in which after the honeycomb structure has been immersed in a slurry containing the oxide catalyst, this is pulled out and then heated may be used.

In a case where the oxide catalyst is to be supported only on the large-volume cells, for example, the following method may be used: with respect to the honeycomb structure obtained through the above-mentioned processes, an opening-sealing process is carried out on the opening end portions only of the small-volume cells by using a material (for example, a plastic material or the like) that is made to disappear in the heating process after the pulling-out process, and the resulting honeycomb structure is then immersed into a slurry containing the oxide catalyst.

Moreover, in order to make the amounts of catalyst to be supported on the cell walls different between the large-volume cells and the small-volume cells, for example, after the catalyst has been allowed to be bound only to one side of the cell walls forming the cells by using the same sequence of processes used for supporting the oxide catalyst only on the cell walls forming the large-volume cells, the oxide catalyst is also supported on the cell walls forming the cells on the other side; and in this case, the following methods may be used: a method in which the immersing time of the honeycomb structure in the slurry containing the oxide catalyst is changed, or a method in which the slurry concentration is changed, or a method in which the slurry with the catalyst having the larger particulate diameter is filled into the large-volume cells, or a method in which after the slurry has been allowed to adhere, the concentration thereof is changed through an air-blowing operation, and the like.

The manufacturing method of a honeycomb structure according to the embodiment of the present invention that has been explained relates to an aggregated honeycomb structure formed by a plurality of honeycomb fired bodies that are combined with one another by interposing a sealing material layer (adhesive layer); however, the honeycomb structure to be manufactured by the manufacturing method of the present invention may be an integral honeycomb structure made of a pillar-shaped honeycomb block composed of one honeycomb fired body. Preferably, the integral honeycomb structure is mainly composed of a material such as cordierite and aluminum titanate.

Upon manufacturing such an integral honeycomb structure, first, a honeycomb molded body is manufactured by using the same method as the method for manufacturing an aggregated honeycomb structure, except that the size of a honeycomb molded body molded through an extrusion-molding process is greater than that in a case of manufacturing the aggregated honeycomb structure.

Next, in the same manner as the manufacturing method for the aggregated honeycomb structure, the honeycomb molded body is dried by using a drying apparatus, such as a microwave drying apparatus, a hot-air drying apparatus, a dielectric drying apparatus, a reduced-pressure drying apparatus, a vacuum drying apparatus and a frozen drying apparatus.

Next, if necessary, a cutting process is carried out on the dried honeycomb molded body so that the two ends thereof are cut.

Next, a predetermined amount of plug material paste to form plugs is filled into end portions on the outlet side of the flow-in side cells as well as into end portions on the inlet side of the flow-out side cells so that the cells are sealed.

Thereafter, in the same manner as the manufacturing processes of the aggregated honeycomb structural body, degreasing and firing processes are carried out on the resulting honeycomb molded body so that honeycomb blocks are manufactured, and a sealing material layer (coat layer) is formed if necessary. Next, by supporting a catalyst thereon by using the above-mentioned method, an integral honeycomb structure is manufactured.

With respect to the applications of the honeycomb structure according to the embodiment of the present invention, although not particularly limited, it is preferably used for an exhaust-gas purifying apparatus for vehicles.

Figure 5:
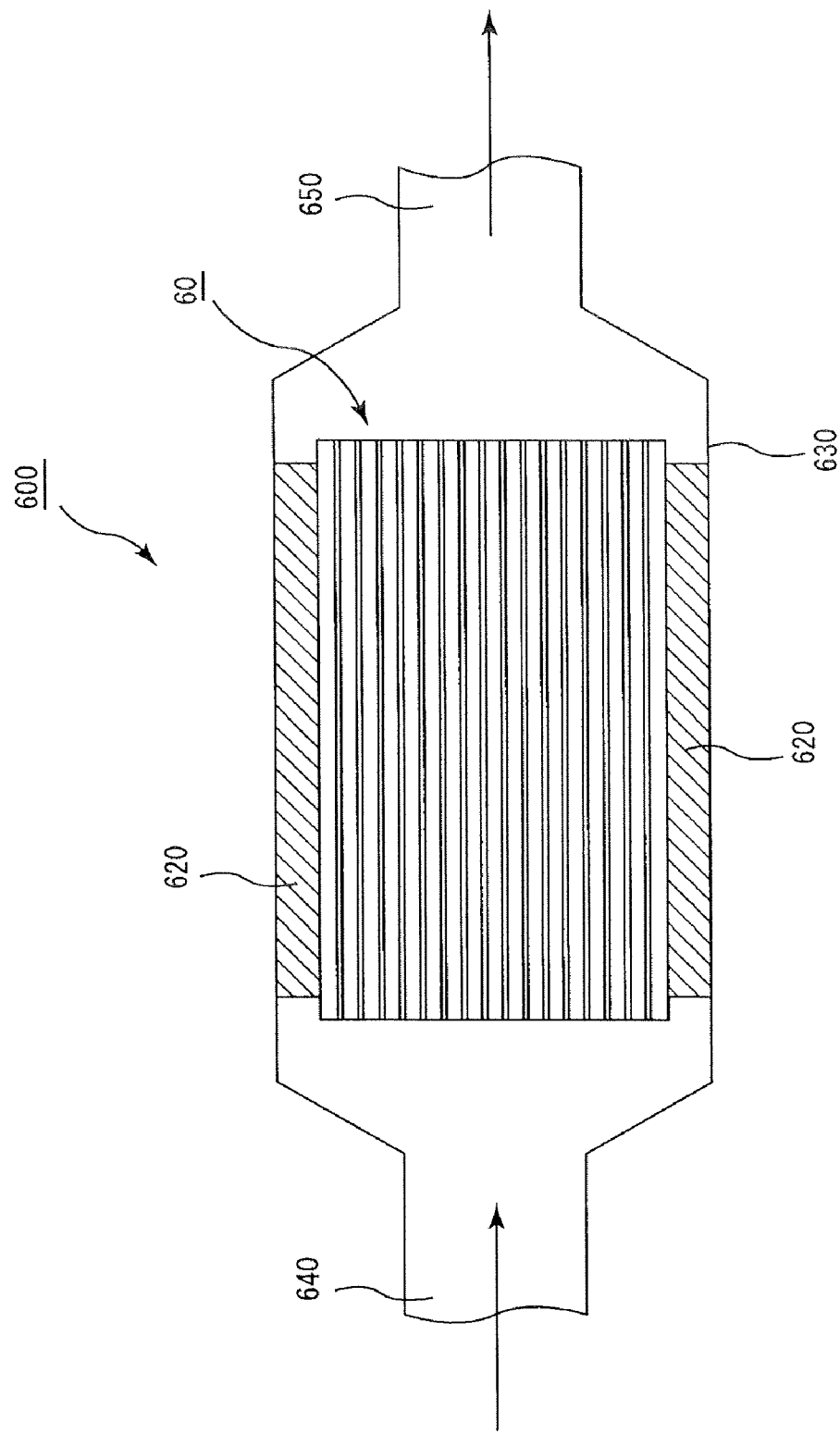
FIG. 5 is a cross-sectional view schematically showing one example of an exhaust-gas purifying apparatus in which the honeycomb structure according to the embodiment of the present invention is used.
Figure 6:
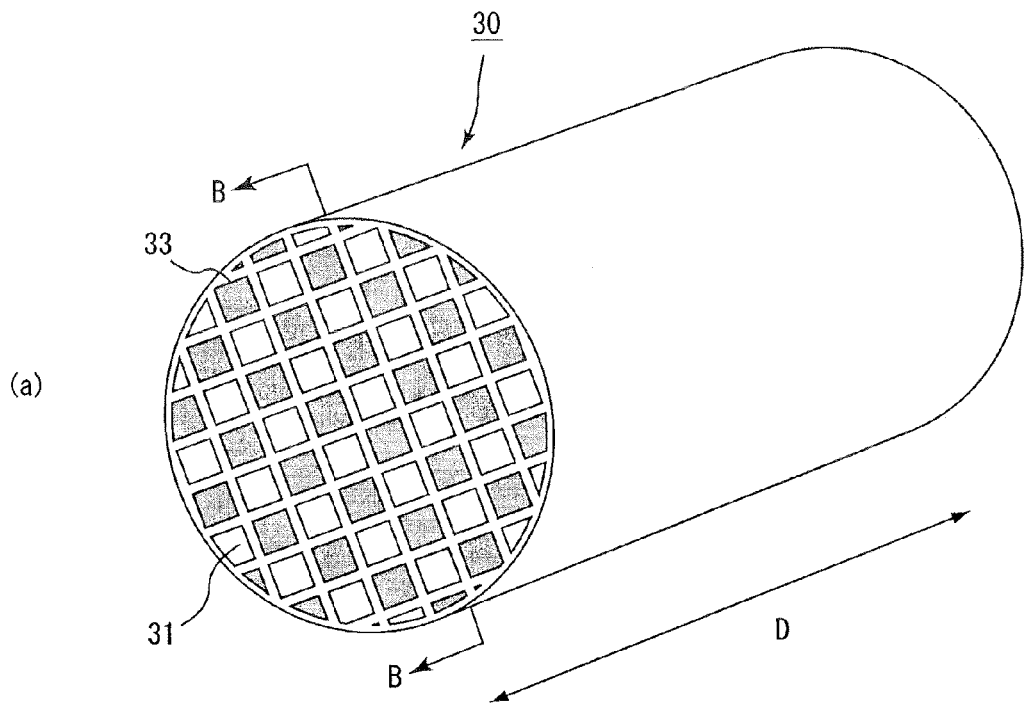
FIG. 6(a) is a perspective view schematically showing one example of a conventional honeycomb structure.
FIG. 6(b) is a cross-sectional view taken along line B-B thereof.
Figure 6:
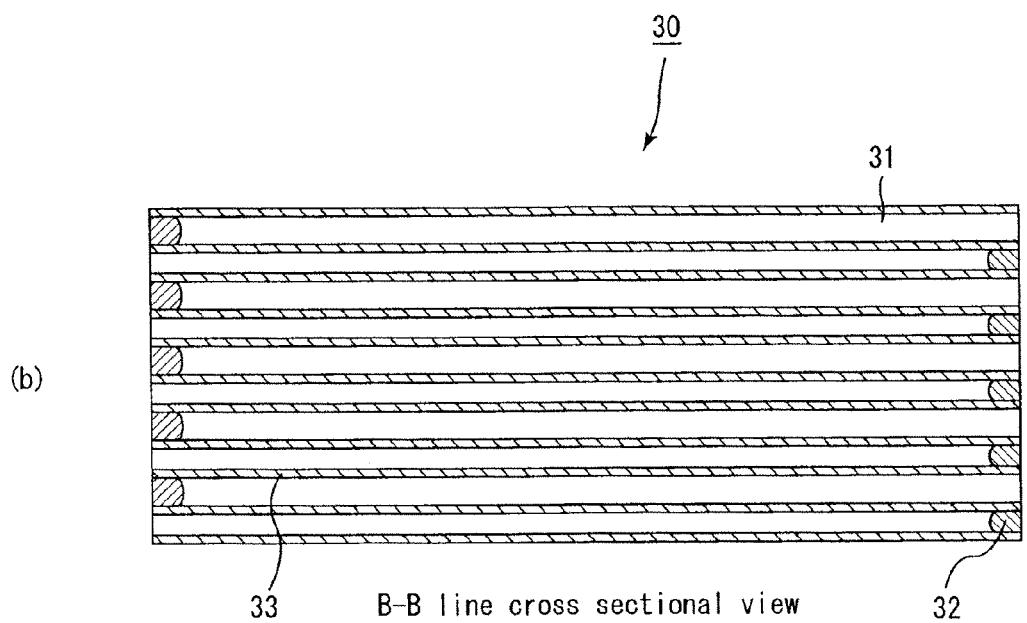

FIG. 5 is a cross-sectional view schematically showing one example of an exhaust-gas purifying apparatus of a vehicle in which the honeycomb structure according to the embodiment of the present invention is installed.

As shown in FIG. 5, an exhaust-gas purifying apparatus 600 is mainly composed of a honeycomb structure 60 according to the embodiment of the present invention, a casing 630 that covers the honeycomb structure 60 from outside and a holding sealing material 620 placed between the honeycomb structure 60 and the casing 630; and an introducing pipe 640 coupled to an internal combustion system, such as an engine, is connected to the end portion of the casing 630 on the side into which exhaust gases are introduced, and a discharge pipe 650 coupled to the outside is connected to the other end portion of the casing 630. Here, arrows in FIG. 5 indicate flows of the exhaust gases.

In the exhaust-gas purifying apparatus 600 having the above-mentioned structure, exhaust gases, discharged from the internal combustion system such as an engine, are introduced into the casing 630 through the introducing pipe 640, allowed to flow into the honeycomb structure 60 from the flow-in side cell, and surely pass through the cell walls so that particulates are captured by the cell walls to purify the exhaust gases, and the purified gases are discharged out of the honeycomb structure 60 from the flow-out side cells, and then externally discharged through the discharge pipe 650.

When a large amount of particulates have been accumulated on the cell walls of the honeycomb structure 60 to cause a high pressure loss, a regenerating process is carried out on the honeycomb structure 60.

In the regenerating process, particulates are burned and eliminated by using a post-injection system, a heater, or the like.

EXAMPLES

The following description will discuss the present invention in more detail by means of examples; however, the present invention is not intended to be limited only by these examples.

As honeycomb fired bodies, a honeycomb fired body, which is a structural unit for a honeycomb structure in accordance with the present invention having large-volume cells and small-volume cells, and a honeycomb fired body, which is a structural unit for a conventional honeycomb structure having cells all of which have the same shape, were manufactured, and the pressure loss upon purifying the exhaust gases and the regenerating time were measured with changing the amounts of catalysts to be respectively supported thereon, and the values of both samples were compared.

Manufacturing Honeycomb Fired Body of the Present Invention

Powder of α-type silicon carbide having an average particle diameter of 22 μm (70% by weight) and powder of β-type silicon carbide having an average particle diameter of 0.5 μm (30% by weight) were wet-mixed, and to the resulting mixture of 100 parts by weight were added and kneaded 6 parts by weight of an organic binder (methyl cellulose), 4 parts by weight of acrylic particles having an average particle diameter of 20 μm and 18 parts by weight of water to prepare a mixed composition. Next, after slight amounts of a plasticizer and a lubricant had been added to the mixed composition, the resulting mixed composition was further kneaded, and then extrusion-molded so that a raw honeycomb molded body having virtually the same cross-sectional shape as the cross-sectional shape shown in FIG. 3(a) was manufactured.

Next, the raw honeycomb molded body was dried by using a micro-wave drying apparatus so that a dried body of the honeycomb molded body was formed, and predetermined cells were filled with a plug material paste (a plug) having the same composition as the raw molded body, and this was again dried by using a drying apparatus.

The dried honeycomb molded body was degreased at 400° C., and fired at 2200° C. in a normal-pressure argon atmosphere for 3 hours so that a honeycomb fired body 20, which includes a silicon carbide fired body having a porosity of 45%, an average pore diameter of 15 μm, a size of 34.3 mm×34.3 mm×150 mm (volume 0.176 liters), the number of cells (cell density) of 290 cells/inch$^2$ and a thickness of the cell walls of 0.25 mm, having the same number of large-volume cells 21a and the small-volume cells 21b, was manufactured.

Here, on one of the end faces of the resulting honeycomb fired body 20, only the large-volume cells 21a were sealed by plugs (plug material paste), while on the other end face, only the small-volume cells 21b were sealed by plugs (plug material paste).

Next, in order to support $CeO_2$ and $ZrO_2$ serving as an oxide catalyst on the cell walls of the honeycomb fired body, the honeycomb fired body was immersed in a solution containing 10 g of $CZ(nCeO_2\text{-}mZrO_2)$, 40 ml of water and an appropriate amount of a pH adjusting agent for 5 minutes, and fired at 500° C.

Manufacturing Conventional Honeycomb Fired Body

A conventional honeycomb fired body a having cells all of which had the same shape was manufactured, and the same manufacturing method as that of the honeycomb fired body of the present invention except that the amount of catalyst supported thereon was set to the value shown in Table 2 was carried out so that a honeycomb fired body was manufactured.

Respective physical property values of the honeycomb fired body according to the present invention and the conventional honeycomb fired body thus manufactured are collectively shown in Table 1.

Examples 1 to 3

Honeycomb fired bodies according to the present invention were manufactured with each of the amounts of catalyst supported on the cell walls being set to a value shown in Table 2, and the following tests were carried out thereon.

Comparative Example 1

By using the honeycomb fired body according to the present invention as the honeycomb fired body, the following tests were carried out in the same manner as Examples except that the amounts of catalyst supported on the cell walls were set to the same value between the large-volume cells and the small-volume cells.

Comparative Examples 2 and 3

By using the conventional honeycomb fired body as the honeycomb fired body, the following tests were carried out in the same manner as Examples except that each of the amounts of catalyst was set to a value shown in Table 2.

Comparative Example 4

The following tests were carried out in the same manner as Example 1 except that honeycomb fired bodies in which the catalyst was supported not on the cell walls, but inside the cell walls were used.

Here, in order to support the catalyst inside the cell walls, the particle diameter of the catalyst contained in the slurry was made sufficiently small, and the catalyst was supported not on the cell walls, but in the pores of the honeycomb fired body.

Evaluation Method

With respect to the honeycomb fired bodies according to Examples 1 to 3 and Comparative Examples 1 to 4, a pressure-loss measuring test and a particulate burning test were carried out.

(i) Pressure Loss Measuring Test

Each of the honeycomb fired bodies was placed in an exhaust pipe connected to a blower, and by allowing air to pass at a flow rate of 5 m/s, the initial pressure loss was measured based upon a pressure difference.

The results of the pressure loss measurements are shown in Table 2.

(ii) Particulate Burning Test

Figure 7:
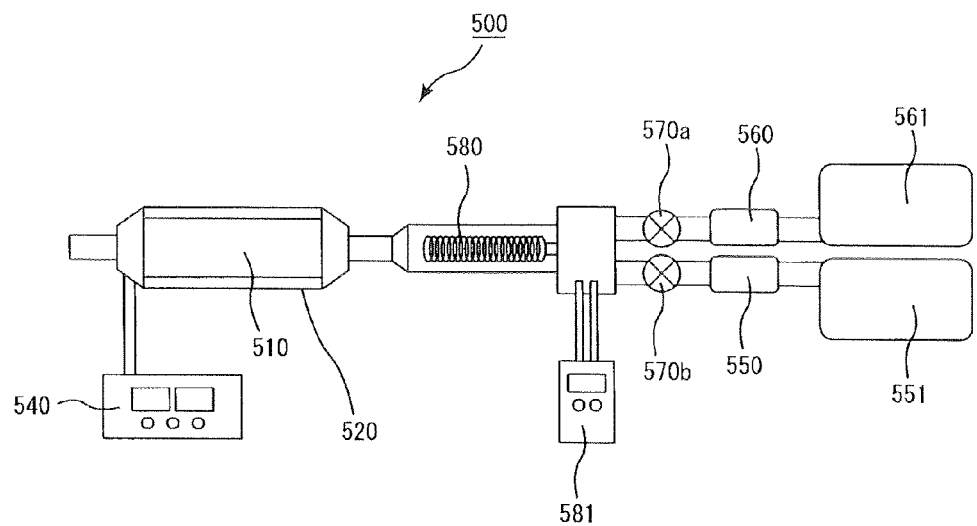
FIG. 7 is a schematic view showing a particulate burning test device.

By using a particulate burning test device 500 shown in FIG. 7, the test was executed in the following sequence of processes. FIG. 7 is a schematic view showing a particulate burning test device.

(1) First, a honeycomb structure is connected to an exhaust pipe of a diesel engine of 2 L so that particulates of 2 g/l were captured.

(2) Next, the honeycomb structure 510 that had captured the particulates was placed on a sample holder 520.

Then, a $N_2$ gas heated by a heater 580 was continuously introduced into the honeycomb structure 510 by a $N_2$ gas bombe 561, and this state was maintained until the temperature of the $N_2$ gas inside the honeycomb structure was stabilized at 650° C. Here, the flow rate of the nitrogen gas was adjusted to a space velocity (SV)=72000 (1/hr) by using a valve 570a and a $N_2$ gas flow meter 560.

In the particulate burning test device 500, the temperature inside the honeycomb structure was measured by a thermocouple inserted at a position 15 cm apart from the gas flow-in side of the honeycomb structure.

(3) After the $N_2$ gas temperature inside the honeycomb structure had been stabilized, a mixed gas containing $N_2$ gas of 90% by volume and $O_2$ of 10% by volume, respectively from the $N_2$ gas bombe 561 and an $O_2$ gas bombe 551, was adjusted to a space velocity (SV)=72000 (1/hr) at a temperature of 600° C., and introduced into the honeycomb structure 510 so that particulates deposited inside the honeycomb structure 510 were burned.

Here, the temperature adjustment of the mixed gas was carried out by a heater 580 and a heating control device 581, and the adjustment on the space velocity (SV) of the mixed gas was carried out by valves 570a, 570b, a $N_2$ gas flow meter 560 and an $O_2$ gas flow meter 550.

Here, upon introduction of the mixed gas, CO gas and $CO_2$ gas, discharged from the honeycomb structure 510, were measured by using a gas analyzer 540 on the gas flow-out side of the honeycomb structure 510, and the time period from the start of the mixed gas introduction until both of CO gas and $CO_2$ gas had been no longer detected was measured so that the time period was defined as "regeneration time".

The results (regeneration time) of the particulate burning test are shown in Table 2.

TABLE 1

| | Cell shape (*) | Thickness of cell wall [mm] | Cell density [cpsi] | Flow-in side aperture ratio[%] | Large-volume cell [l] | Small-volume cell [l] | Volume ratio [-] |
|---|---|---|---|---|---|---|---|
| Honeycomb fired body 1 | Large + Small | 0.25 | 290 | 48.2 | 0.118 | 0.068 | 2.03 |
| Honeycomb fired body 2 | Regular | 0.25 | 290 | 34.7 | 0.088 | 0.088 | 1.00 |

(*) Large + Small: Large-volume cell (octagonal shape) and small-volume cell (square shape), Regular: same shape in the entire structure (square shape)

TABLE 2

| | Honeycomb fired body | Supported state | Amount of catalyst on cells on flow-in side [g] | Supported amount [g/l] | Amount of catalyst on cells on flow-out side[g] | Supported amount [g/l] | Ratio of amounts of catalyst on flow-in side to flow-out side [-] | Initial pressure loss [kPa] | Regeneration time [s] |
|---|---|---|---|---|---|---|---|---|---|
| Example 1 | 1 | On cell walls | 1.41 | 11.9 | 0.35 | 6.0 | 2.0 | 10.5 | 152 |
| Example 2 | 1 | On cell walls | 1.60 | 13.6 | 0.16 | 2.8 | 4.9 | 10.3 | 168 |
| Example 3 | 1 | On cell walls | 1.76 | 14.9 | 0 | 0 | — | 10.9 | 184 |
| Comparative Example 1 | 1 | On cell walls | 1.18 | 10.0 | 0.58 | 10.0 | 1.0 | 10.8 | 205 |
| Comparative Example 2 | 2 | On cell walls | 1.18 | 13.4 | 0.58 | 6.6 | 2.0 | 11.6 | 225 |
| Comparative Example 3 | 2 | On cell walls | 1.76 | 20.0 | 0 | 0 | — | 12.8 | 254 |
| Comparative Example 4 | 1 | Inside cell walls | — | 10.0 | — | 10.0 | 1.0 | 12.4 | 310 |

* Amount of catalyst: 1.76 g in the entire honeycomb fired body ⇒ Supported amount with respect to apparent volume: 10 g/l As clearly indicated by the results shown in Table 2, it is found that the honeycomb structure according to Examples has a reduction in pressure loss in comparison with the honeycomb structure according to Comparative Examples. Moreover, with respect to the regeneration time, the honeycomb fired body according to Examples has a shorter time in comparison with that of the honeycomb fired body according to Comparative Examples.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A pillar-shaped honeycomb structure comprising:
a plurality of cells placed in parallel with one another in a longitudinal direction with a cell wall therebetween;
a plug sealing either one of end portions of each of said plurality of cells; and
a catalyst being supported on said cell wall,
wherein
said plurality of cells are composed of large-volume cells and small-volume cells,
said large-volume cell has a larger cross-sectional area perpendicular to a longitudinal direction thereof than a cross-sectional area perpendicular to the longitudinal direction of said small-volume cell,
said large-volume cell is sealed at one end portion of said honeycomb structure, while the small-volume cell is sealed at the other end portion of said honeycomb structure,
said large-volume cells are defined by first cell wall parts of said cell wall that extend halfway from a respective large-volume cell to respective adjacent cells, said first cell wall parts extending around a perimeter of said respective large-volume cell,
said small-volume cells are defined by second cell wall parts of said cell wall that extend halfway from a respective small-volume cell to respective adjacent cells, said second cell wall arts extending around a perimeter of said respective small-volume cell,
said catalyst is supported uniformly about an entire perimeter of said large-volume cells,
an amount of said catalyst supported on the first cell wall parts forming said large-volume cells is about 2 to about 10 times larger per unit volume than an amount of said catalyst supported on the second cell wall parts forming said small-volume cells,
said catalyst is an oxide catalyst that includes an oxide and/or is capable of oxidizing a compound, and
the amount of said catalyst is about 5 to about 60 g/l with respect to an apparent volume of said honeycomb structure.

2. The honeycomb structure according to claim 1, wherein said catalyst includes at least one compound selected from the group consisting of $CeO_2$, $ZrO_2$, $FeO_2$, $Fe_2O_3$, $CuO$, $CuO_2$, $Mn_2O_3$, $MnO$, and a composite oxide represented by a composition formula $A_nB_{1-n}CO_3$ (wherein A is La, Nd, Sm, Eu, Gd or Y, B is an alkali metal or alkali-earth metal, and C is Mn, Co, Fe or Ni, with n being in a range of $0 \leq n \leq 1$).

3. The honeycomb structure according to claim 1, wherein said catalyst contains at least $CeO_2$.

4. The honeycomb structure according to claim 2, wherein the amount of said catalyst is about 10 to about 60 g/l with respect to an apparent volume of said honeycomb structure.

5. The honeycomb structure according to claim 3, wherein the amount of said catalyst is about 10 to about 60 g/l with respect to an apparent volume of said honeycomb structure.

6. The honeycomb structure according to claim 1, wherein the catalyst is supported on the cell wall and is not substantially supported inside the cell wall.

7. The honeycomb structure according to claim 2, wherein a noble metal catalyst is further supported on the cell wall.

8. The honeycomb structure according to claim 3, wherein a noble metal catalyst is further supported on the cell wall.

9. The honeycomb structure according to claim 1, wherein a catalyst supporting layer made from oxide ceramics is formed on the cell wall.

10. The honeycomb structure according to claim 1, wherein the cell wall includes:
first cell wall parts between adjacent large-volume cells; and
first cell wall parts and second cell wall parts between large-volume cells and small-volume cells adjacent thereto.

11. The honeycomb structure according to claim 1, wherein the thickness of the cell wall is in a range from about 0.20 to about 0.40 mm.

12. The honeycomb structure according to claim 1, wherein the cross-sectional areas of the large-volume cells and the small-volume cells have a polygonal shape which has at least four sides.

13. The honeycomb structure according to claim 1, wherein the cross-sectional area of the large-volume cells has an octagonal shape.

14. The honeycomb structure according to claim 1, wherein either or both of the cross section area of the large-volume cells and the cross section area of the small-volume cells have a polygonal shape, and the polygonal shape is at least one of a square shape, pentagonal shape, hexagonal shape, trapezoidal shape and octagonal shape.

15. The honeycomb structure according to claim 1, wherein a ratio of the cross-sectional area of the large-volume cells on a plane surface perpendicular to the longitudinal direction in relation to the cross-sectional area of the small-volume cells on a plane surface perpendicular to the longitudinal direction is in a range from about 1.20 to about 6.00.

16. The honeycomb structure according to claim 1, wherein at least one of the large-volume cell and the small-volume cell has at least one of an R-chamfered shape and a C-chamfered shape in the cross-sectional area perpendicular to the longitudinal direction.

17. The honeycomb structure according to claim 16, wherein an R-dimension of the R-chamfered shape and a C-dimension of the C-chamfered shape is in a range from about 0.3 mm to about 2.5 mm.

18. The honeycomb structure according to claim 1, wherein the honeycomb structure is a honeycomb block having a plurality of honeycomb fired bodies which are connected with one another by interposing a sealing material layer between the honeycomb fired bodies.

19. The honeycomb structure according to claim 1, wherein the honeycomb structure is a single honeycomb block formed as a single sintered body as a whole.

20. The honeycomb structure according to claim 18, wherein the honeycomb fired body comprises silicon carbide or a blend of silicon carbide and metallic silicon.

21. The honeycomb structure according to claim 19, wherein the honeycomb block comprises cordierite or aluminum titanate.

22. The honeycomb structure according to claim 1, said catalyst is supported uniformly about an entire perimeter of said small-volume cells.

* * * * *

UNITED STATES PATENT AND TRADEMARK OFFICE
CERTIFICATE OF CORRECTION

| | | |
|---|---|---|
| PATENT NO. | : 8,039,415 B2 | Page 1 of 1 |
| APPLICATION NO. | : 11/864565 | |
| DATED | : October 18, 2011 | |
| INVENTOR(S) | : Kazushige Ohno and Masafumi Kunieda | |

It is certified that error appears in the above-identified patent and that said Letters Patent is hereby corrected as shown below:

IN THE CLAIMS:

Column 23, Line 40, Claim 1, the line should read as follows:
second cell wall parts extending around a perimeter of Signed and Sealed this
Twenty-fourth Day of January, 2012

David J. Kappos
*Director of the United States Patent and Trademark Office*